(12) United States Patent
Usui

(10) Patent No.: US 7,489,599 B2
(45) Date of Patent: Feb. 10, 2009

(54) OPTICAL DISC REPRODUCING APPARATUS

(75) Inventor: Syunji Usui, Fukushima (JP)

(73) Assignee: D&M Holdings Inc., Kawasaki-shi (JP)

( * ) Notice: Subject to any disclaimer, the term of this patent is extended or adjusted under 35 U.S.C. 154(b) by 692 days.

(21) Appl. No.: 11/072,453

(22) Filed: Mar. 7, 2005

(65) Prior Publication Data

US 2006/0026614 A1  Feb. 2, 2006

Related U.S. Application Data

(63) Continuation-in-part of application No. 10/950,659, filed on Sep. 28, 2004.

(30) Foreign Application Priority Data

Jul. 29, 2004  (JP)  ............................... 2004-221740

(51) Int. Cl.
  *G11B 21/08*  (2006.01)
  *G10H 7/00*  (2006.01)
(52) U.S. Cl. .................... 369/30.27; 369/30.19; 84/626
(58) Field of Classification Search .............. 369/30.19, 369/30.23, 30.24, 30.36, 4, 30.27; 84/605, 84/626, 628, 636
  See application file for complete search history.

(56) References Cited

U.S. PATENT DOCUMENTS

| 5,289,439 | A | 2/1994 | Koulopoulos et al. | |
| 6,751,167 | B2 * | 6/2004 | Yamada et al. | 369/30.19 |
| 6,967,905 | B2 * | 11/2005 | Miyashita et al. | 369/30.11 |
| 6,985,418 | B2 * | 1/2006 | Hori | 369/47.38 |
| 7,042,814 | B2 * | 5/2006 | Yamada et al. | 369/30.26 |
| 7,115,807 | B2 * | 10/2006 | Yamada et al. | 84/602 |
| 7,218,578 | B2 * | 5/2007 | Usui | 369/30.27 |
| 7,269,103 | B2 * | 9/2007 | Kataoka et al. | 369/30.36 |

FOREIGN PATENT DOCUMENTS

| EP | 1 260 979 A2 | 11/2002 |
| EP | 1 304 700 A2 | 4/2003 |
| EP | 1 394 791 A2 | 3/2004 |
| JP | 03254455 | 11/1991 |
| JP | 11-86446 | 3/1999 |

OTHER PUBLICATIONS

Pioneer Operating Instructions for Compact Disc Player CDJ-100, 20 pgs. Copyright 2001.

* cited by examiner

*Primary Examiner*—Thang V Tran
(74) *Attorney, Agent, or Firm*—Dickstein Shapiro LLP

(57) ABSTRACT

There is provided an optical disc reproducing apparatus which reads out data from an optical disc, stores the data, and reproduces the stored data. The apparatus includes: a casing; an operation disc unit for accepting an instruction as to a speed and a sequence for reading the stored data via a rotational operation therewith, the operation disc unit being provided on a surface of the casing; and depression detecting element for accepting an instruction as to a predetermined operation by way of a depression of the operation disc unit, the depression detecting element being provided below the operation disc unit and on the surface of the casing.

18 Claims, 6 Drawing Sheets

OPTICAL DISC REPRODUCING APPARATUS

CROSS REFERENCE TO RELATED APPLICATIONS

This is a Continuation-in-Part of application U.S. Ser. No. 10/950,659 filed on Sep. 28, 2004, which is hereby incorporated by reference in its entirety.

BACKGROUND OF THE INVENTION

The present invention relates to a technique for an optical disc reproducing apparatus which is capable of reproducing, at a desired speed and in a desired sequence, audio data being read out from an optical disc and being stored.

In some cases, while reproducing signals recorded on an analogue phonorecord, a disc jockey (DJ) or the like performs a special reproduction, called as scratch reproduction, which generates effect sounds like a scratch sound.

When the DJ or the like performs the scratch reproduction by use of an analogue record player, he or she manually and forcibly turns the analogue phonorecord being reproduced, rapidly clockwise as a normal turning direction or counterclockwise as a reverse direction, thereby generating a scratch sound. There has been developed an optical disc reproducing apparatus, which allows performing a scratch reproduction similar to that of employing the analogue phonorecord player as described above, by use of an optical disc such as a CD (Compact Disc) (for example, see the Unexamined Japanese Patent Laid-open KOKAI Publication No. H11-86446).

This optical disc reproducing apparatus is provided with a discal shaped jog dial and a memory which stores audio data read out from the optical disc. When a DJ or the like turns the jog dial clockwise or counterclockwise, the audio data stored in the memory is read out at a speed and in a sequence according to the rotation, thereby generating a scratch sound. The optical disc reproducing apparatus as thus described allows the DJ or the like to perform a scratch reproduction by use of an optical disc, similar to the scratch reproduction using an analogue phonorecord, by rotationally manipulating the jog dial as performed on the analogue phonorecord.

SUMMARY OF THE INVENTION

This optical disc reproducing apparatus is provided with input buttons in addition to the jog dial. For example, the input buttons include "A" button to set a start point (A point), from which loop (repeat) playback is started; "B" button to set an end point (B point) being the end point of the loop playback; a queue button for returning to a position (queue point) at which a track reproduction is started and for setting a standby mode; a pitch bend button which varies a reproducing speed; a memo button which sets a memo mode to store and read out the setup data such as A point and B point for the loop playback; a preset button to set a preset mode for setting an initial state; a pitch slider which adjusts the reproducing speed; and so on.

In the optical disc reproducing apparatus as thus described, a size of the jog dial is required to be equivalent to the size of the analogue phonorecord, in order to provide an operation feeling similar to that of a turntable for the analogue phonorecord. However, since upsizing of the apparatus need to be avoided, an area of operation panel for mounting the jog dial is limited. Therefore, if the size of the jog dial is enlarged, placement of the multiple input buttons as described above may be difficult. In this case, if the input buttons are made in small size, operability may be deteriorated.

The present invention is useful for a technique applied to an optical disc reproducing apparatus so as to arrange input buttons efficiently as well as enhancing operability thereof.

A first aspect of the present invention is directed to an optical disc reproducing apparatus which reads out data from an optical disc, stores the data, and reproduces the stored data, including:

a casing;

an operation disc unit which is provided on a surface of the casing, and which accepts an instruction as to a speed and a sequence for reading the stored data via a rotational operation therewith; and depression detecting element which is provided below the operation disc unit and on the surface of the casing, and which accepts an instruction as to a predetermined operation by way of a depression of the operation disc unit.

BRIEF DESCRIPTION OF THE DRAWINGS

The invention will now be described by way of examples with reference to the accompanying drawings, throughout which like parts are referred to by like references, and in which.

DETAILED DESCRIPTION OF THE INVENTION

Hereinafter, preferred embodiments of the present invention will be explained in detail with reference to the accompanying drawings. An embodiment of the present invention as described in the following is directed to an optical disc reproducing apparatus which allows reproducing digital audio data recorded on an optical disc at a desired speed and in a desired sequence in accordance with the instructions via a jog dial.

Figure 1:
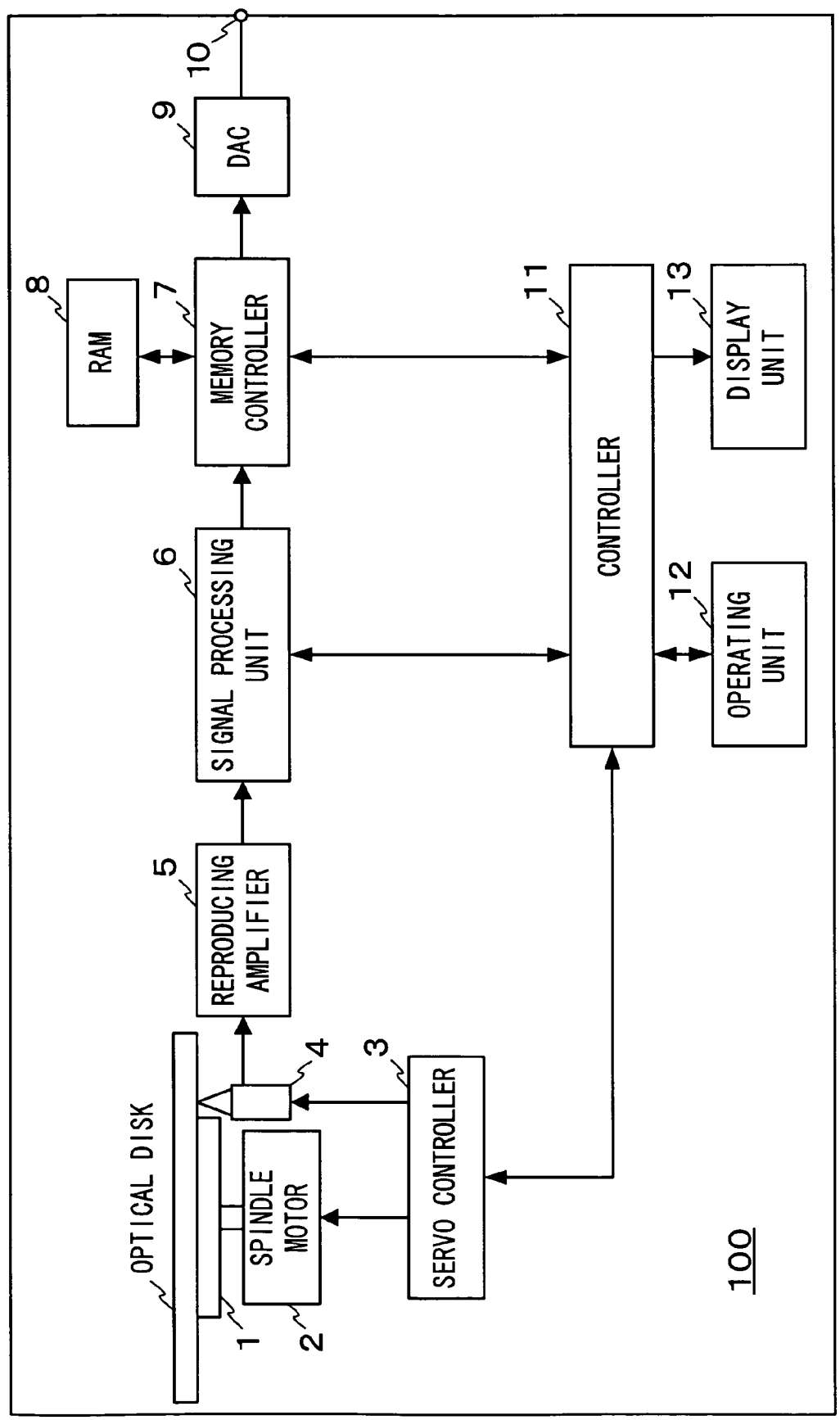
FIG. 1 is a block diagram showing an optical disc reproducing apparatus according to an embodiment of the present invention.

FIG. 1 is a block diagram showing the optical disc reproducing apparatus 100 relating to an embodiment of the present invention. The optical disc reproducing apparatus 100 as shown in FIG. 1 is provided with a turntable 1, a servo control section 3, an optical pickup 4, a reproducing amplifier 5, a signal processing section 6, a memory control section 7, RAM (Random Access Memory) 8, DAC (Digital to Analog Converter) 9, a display section 13, an operating unit 12, a control section 11, and an output terminal 10.

The turntable 1 is fixed to a spindle motor 2, and holds an optical disc such as a CD (Compact Disc).

The servo control section 3 controls the spindle motor 2 in response to an instruction for reproduction so that the spindle motor 2 is rotationally driven at a predetermined linear speed.

In addition, the servo control section 3 controls a focus servo circuit and a tracking servo circuit, not illustrated, so as to properly trace pit arrays on the optical disc.

The optical pickup 4 reads digital data recorded on the optical disc.

The reproduction amplifier 5 allows the digital audio data read by the optical pickup 4 to be subjected to waveform shaping and amplification.

The signal processing section 6 performs a processing onto the digital audio data transmitted from the reproduction amplifier 5, such as decoding, and extracting error signals including a focus error signal and a tracking error signal, and a synchronized signal.

The memory control section 7 performs control to input the digital audio data from the signal processing section 6 to the RAM 8 that will be described in the following.

The RAM 8 stores the digital audio data thus inputted. The audio digital data stored in the RAM 8 is read out under the control of the memory control section 7.

The DAC 9 converts the digital audio data read out from the RAM 8 into an analog audio signal. The analog audio signal converted by the DAC 9 is outputted through the output terminal 10. The output terminal 10 is connected to an output unit such as a speaker, not illustrated.

The display section 13 displays a reproducing time, the track number and the like, for the track currently being a target of reproduction. It is to be noted that installation of the display section 13 is optional.

The operating unit 12 constitutes an input unit which accepts an instruction from a user, for example, from a DJ, such as an instruction for playback/stop playback and an instruction for ejecting.

The control section 11 controls the entire optical disc reproducing apparatus 100 in centralized manner.

Figure 2:
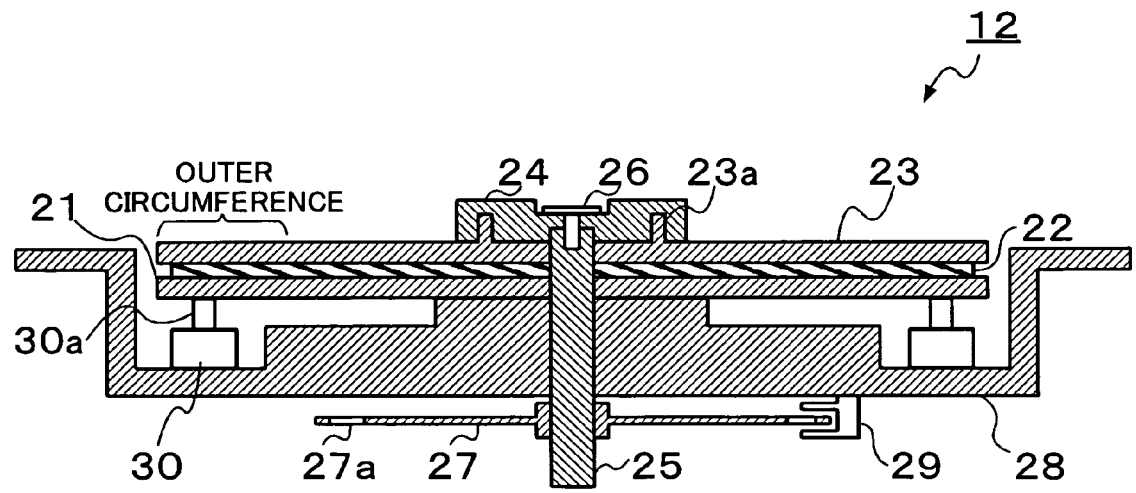
FIG. 2 is a side sectional view showing the optical disc reproducing apparatus according to an embodiment of the present invention.
Figure 3:
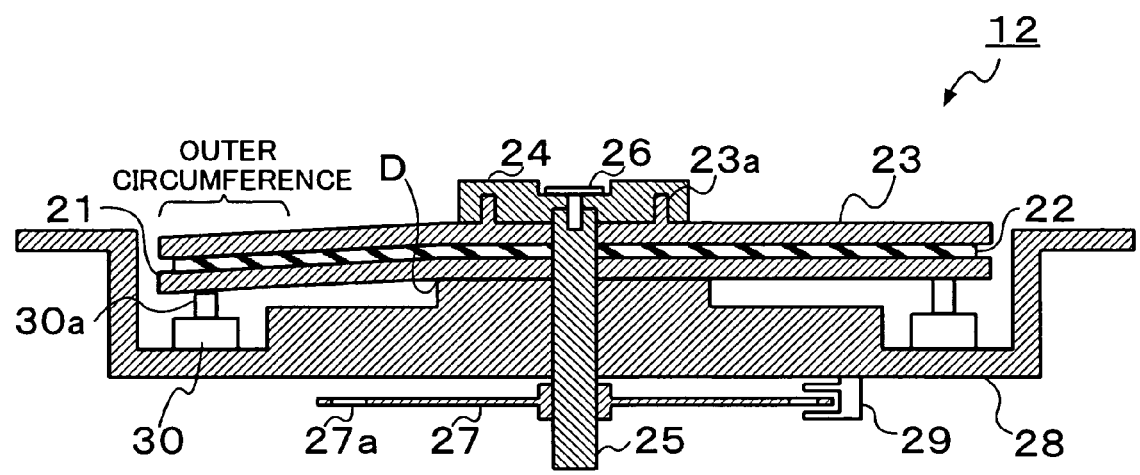
FIG. 3 is a side sectional view showing the optical disc reproducing apparatus according to an embodiment of the present invention.

FIG. 2 is a side cross sectional view showing the optical disc reproducing apparatus 100, in particular, the operating unit 12. FIG. 3 shows a status wherein the outer circumference of the operation disc unit is depressed. The operating unit 12 as shown in FIG. 2 is provided with a table 21, a mat 22, the operation disc unit 23, a spindle 25, a scale 27, a light sensor unit 29, and push detectors 30 each of which has a switch portion 30a, being mounted inside and outside a casing 28 which constitutes the outer shape of the optical disc reproducing apparatus 100.

The table 21 has a discal shape, and it is fixed outside the casing 28. The table 21 is made of polycarbonate resin, for example.

The mat 22 is formed by a circular shaped sheet-like member having approximately the same diameter as that of the table 21. The mat 22 is made of a resin material or the like, having small frictional coefficient and generating little static electricity. The mat 22 may be a slip mat, and it is utilized so that the operation disc unit 23 can smoothly rotate on the table 21.

The operation disc unit 23 is installed on the upper surface of the mat 22. The operation disc unit 23 has a discal shape having approximately the same diameter as that of the table 21, and is mounted on the table 21 with the mat 22 therebetween. The operation disc unit 23 has a diameter corresponding to the size of an analogue phonorecord, for example, with the diameter of 8 cm to 30 cm. The table 21 is made of polycarbonate resin, for example. Here, if the operation disc unit 23 is made of such a material as allows the operation disc unit 43 to turn smoothly on the table 21 and as generates little static electricity, the mat 22 may not be installed.

The operation disc unit 23 is mounted so that it can be rotationally manipulated by a user. As described in detail in the following, according to the rotational operation of the operation disc unit 23, the speed and sequence for reading out the audio data stored in the RAM 8 are controlled.

The table 21, the mat 22 and the operation disc unit 23 respectively correspond to the turntable, the slip mat and the analogue phonorecord as in the case of the analogue record player. Therefore, the user can manipulate the optical disc reproducing apparatus 100 with a similar feeling as using the analogue record player.

The spindle 25 is provided so that it penetrates approximately the center of the table 21, the mat 22 and the operation disc unit 23. The spindle 25 penetrates also the casing 28 and extends to the inside thereof. A circular holder 24 holds the top end of the spindle 25 on the operation disc unit 23. A projecting portion 23a of the operation disc unit 23 is inserted into a recess portion of the holder 24, and the holder 24 is fixed onto the spindle 25 via a screw 26. With this structure, the operation disc unit 23 can turn on the table 21 mounted on the outer surface of the casing 28, without detached from the spindle 25 even when it is operated rotationally.

The scale 27 is formed, for example, by a discal member having a diameter smaller than the operation disc unit 23. The spindle 25 penetrates approximately the center of the scale 27, and the scale 27 is fixed on the lower part of the spindle 25 inside the casing 28 via a screw not illustrated. The operation disc unit 23 and the scale 27 can turn together through the spindle 25. Therefore, when the operation disc unit 23 is rotatably operated, the scale 27 also is turned at the same turning speed and in the same turning direction as those for the operation disc unit 23.

A slit portion 27a is provided on the outer circumference of the scale 27. The slit portion 27a is formed, for example, by a rectangle-shaped slit or a printing with a print coating including carbon.

The light sensor unit 29 is provided on the casing 28 at a location where the slit portion 27a can be detected, in the proximity of the end of the scale 27. The light sensor unit 29 irradiates light of a predetermined wavelength to the slit portion 27a, and an light sensor, not illustrated, receives passing light or reflected light from the slit, whereby the slit portion 27a is detected.

For example, two light sensor units 29, are provided on the identical outer circumference, and they detect the turning speed and the turning direction of the scale 27 which rotates with the operation disc unit 23. When the light sensor units 29 detect the slit portion 27a, they generate from the two light sensors, pulse signal a and pulse signal b having different phases (for example, phase difference of 90 degrees), and output those signals to the controller 11. These pulse signals "a" and "b" different in phase will be referred to as "the first signals" in the following description. Upon detecting the slit portion 27a, the two light sensor units 29 respectively output the pulse signals. Since timing of detecting the slit portion 27a is different depending on where the light sensors are located, a phase difference occurs between the pulse signals being outputted. As described below, the turning direction and the turning speed of the operation disc unit 23 are calculated based on the phase difference between those signals.

Specifically, the controller 11 determines the turning direction of the operation disc unit 23 based on the phase difference between the two pulse-like signals a and b of the first signals, inputted from the light sensor units 29. For example, in the case where the phase difference is 90 degrees, when the operation disc unit 23 turns clockwise, the pulse signal a has phase difference of +90 degrees with respect to the pulse signal b. On the other hand, when the operation disc unit 23 turns counterclockwise, the pulse signal a has phase difference of −90 degrees with respect to the pulse signal b. In addition, the controller 11 determines the turning speed of the operation disc unit 23 based on the number of pulses of either of the pulse signal a and b of the first signals inputted within a predetermined time period.

The push detectors 30 detect that the operation disc unit 23 has been depressed (or touched). Each of the push detectors 30 outputs a second signal indicating occurrence of a depressing event while being depressed, and stops outputting the second signal when the operation disc unit 23 is released from depressing. The controller 11 determines whether or not the operation disc unit 23 has been depressed based on the input of the second signal from the push detectors 30.

The push detectors 30 are placed below the outer circumference of the table 21 and on the upper surface of the casing 28. Each of the push detectors 30 is provided with a switch portion 30a projecting approximately vertically from the main body. The switch portion 30a is a push-style switch being a soft-touch type (providing a reduced rebound resistance when the switch portion 30a is pressed down), and a stroke of the switch portion 30a is around 0.5 mm, for example. When the operation disc unit 23 is not depressed, the upper end of the switch portion 30a contacts the lower surface of the table 21.

As shown in FIG. 3, when a user depresses the outer circumference of the operation disc unit 23, the table 21, the mat 22 and the operation disc unit 23 are bent downward by a depressing force using point D as a supporting point. At this time, when the outer circumference of the table 21 depresses the switch portion 30a of any of the push detectors 30, the push detector 30 thus depressed senses a depressing and outputs the second signal. As described in detail in the following, the controller 11 performs a predetermined processing according to the input of the second signal from the push detectors 30. Therefore, the push detectors 30 serve as a switch to accept a predetermined instruction from the user.

Figure 4:
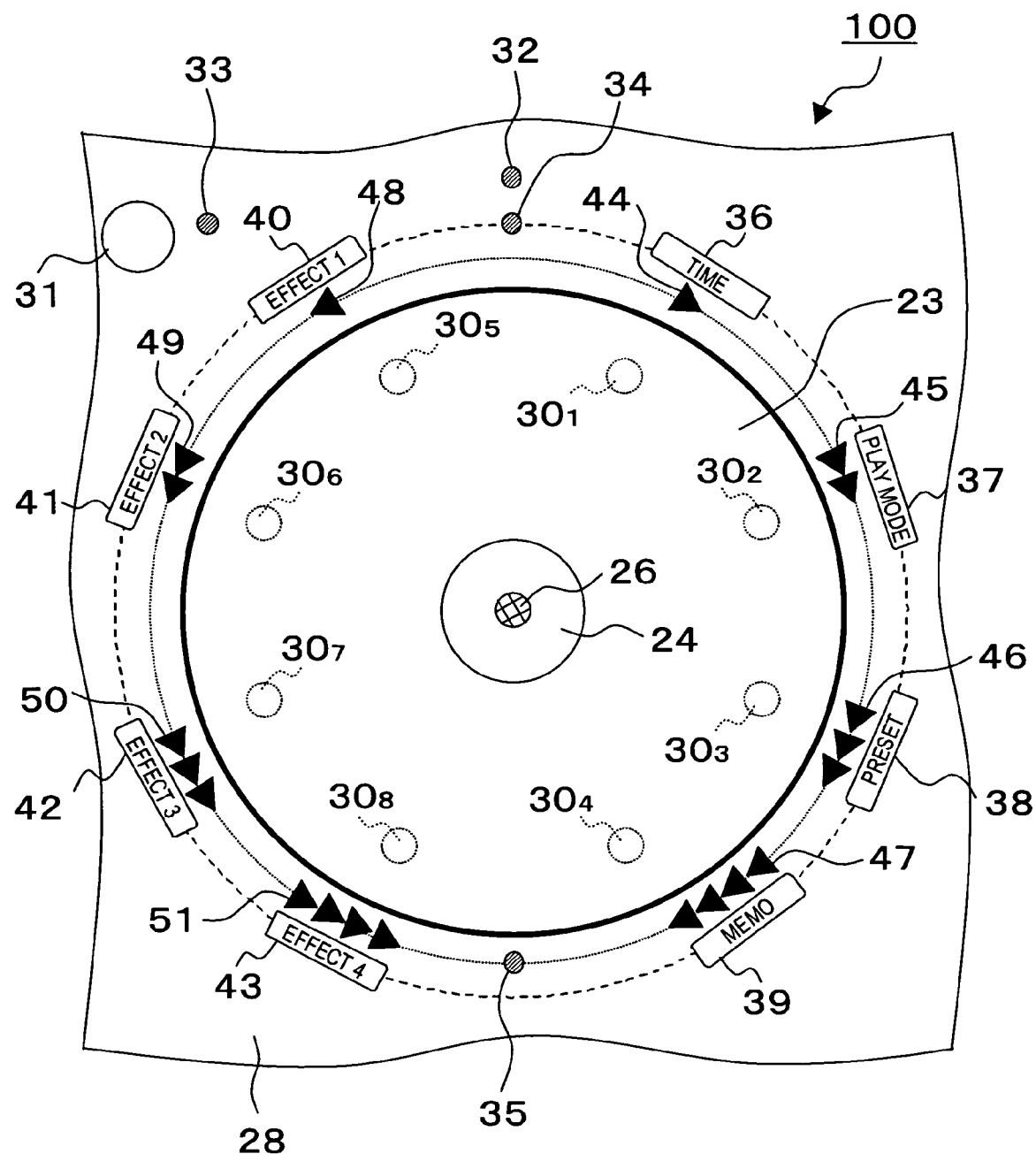
FIG. 4 is a plan view showing the optical disc reproducing apparatus according to an embodiment of the present invention.

FIG. 4 is a plan view showing the operating unit 12 and the proximity thereof in the optical disc reproducing apparatus 100 relating to the present embodiment. As shown in FIG. 4, the operation disc unit 23 constituting the operating unit 12 is exposed on the upper surface of the casing 28. Eight push detectors $30_1$ to $30_8$ are provided on approximately the same radius centered at the spindle 25, inside the outer circumference of the operation disc unit 23. This radius can be set arbitrarily within the radius of the operation disc unit 23.

Mode selection button 31, LEDs 32 to 35, and printed display elements 36 to 43 and 44 to 51 are provided on the upper surface of the casing 28.

The mode selection button 31 is placed on the upper surface of the casing 28 so that it is not covered by the operation disc unit 23. The mode selection button 31 accepts a selection of one operation mode out of predetermined multiple operation modes offered by the optical disc reproducing apparatus 100. The optical disc reproducing apparatus 100 according to the present embodiment is provided with three operation modes; scratch mode, input switch mode, and scan mode. Each operation mode will be explained in detail in the following.

LEDs 32 to 35 are placed on the upper surface of the casing 28 so that it is not covered by the operation disc unit 23. LEDs 32 to 35 are formed by light emitting diode but not limited to this. Another light emitting element may be applicable.

LEDs 33 to 35 indicate which operation mode is selected, depending on which of them emits light. For example, when the scratch mode is selected, LED 33 lights up, when the input switch mode is selected, LED 34 lights up, when the scan mode is selected, LED 35 lights up. The LEDs may be provided according to the number of operation modes which are selectable.

LED 32 lights up when depressing of any one of the push detectors $30_1$ to $30_8$ is detected, and the light is turned off when there is no detection of depressing. It is also possible to provide LEDs corresponding respectively to the push detectors $30_1$ to $30_8$, and each LED may light up when an associated push detector is detected being depressed.

Printed display elements 36 to 51 are provided outside the outer circumference of the operation disc unit 23, for example, respectively on the imaginary linear lines connecting the center of the operation disc unit 23 and the push detectors $30_1$ to $30_8$, and they are located in such a manner as visible by user. Each printed display element 36 to 51 includes marks or letters being printed (for example, by silk screen print process). This marks or letters indicate a location of each of the push detectors $30_1$ to $30_8$, and functions assigned thereto. Marks and letters of the printed display elements 36 to 51 may be displayed by use of a display means such as liquid crystal, or LED.

In the example as shown in FIG. 4, the printed display elements 36 to 43 and printed display elements 44 to 51 respectively indicate different input modes as described below.

The printed display elements 36 to 43 represented by letters respectively indicate functions assigned to the push detectors $30_1$ to $30_8$ in the input switch mode as described below: "TIME" 36 indicates a function of TIME button (a button for instructing a display of reproducing time), which is assigned to the push detector $30_1$; "PLAY MODE" 37 indicates a function of PLAY MODE button (a button for instruction reproduction), which is assigned to the push detector $30_2$, "PRESET" 38 indicates a function of PRESET button (a button for instruction a setting of initial status), which is assigned to the push detector $30_3$; "MEMO" 39 indicates a function of MEMO button (a button for instruction a setting of the setup data such as A point and B point for loop playback), which is assigned to the push detector $30_4$; "EFFECT 1" 40 to "EFFECT 4" 43 respectively indicate various EFFECT buttons (buttons for instruction predetermined effect functions such as echo and plunger), which are assigned to the push detectors $30_5$ to $30_8$.

The printed display elements 44 to 51 which are represented by one or multiple arrows respectively indicate the functions assigned to the push detectors $30_1$ to $30_8$ in the scan mode as described below: The printed display element 44 indicates a function of fast-forward 2× scan, which is assigned to the push detector $30_1$; the printed display element 45 indicates a function of fast-forward 4× scan, which is assigned to the push detector $30_2$; the printed display element 46 indicates a function of fast-forward 8× scan, which is assigned to the push detector $30_3$; the printed display element 47 indicates a function of fast-forward 16× scan, which is assigned to the push detector $30_4$; the printed display element 48 indicates a function of fast-reverse 2× scan, which is assigned to the push detector $30_5$; the printed display element 49 indicates a function of fast-reverse 4× scan, which is assigned to the push detector $30_6$; the printed display element 50 indicates a function of fast-reverse 8× scan, which is assigned to the push detector $30_7$; and the printed display element 51 indicates a function of fast-reverse 16× scan, which is assigned to the push detector $30_8$.

Since the printed display elements 36 to 51 are placed at the positions respectively corresponding to the push detectors $30_1$ to $30_8$, wrong operations on the push detectors $30_1$ to $30_8$ in each mode can be prevented.

Figure 5:
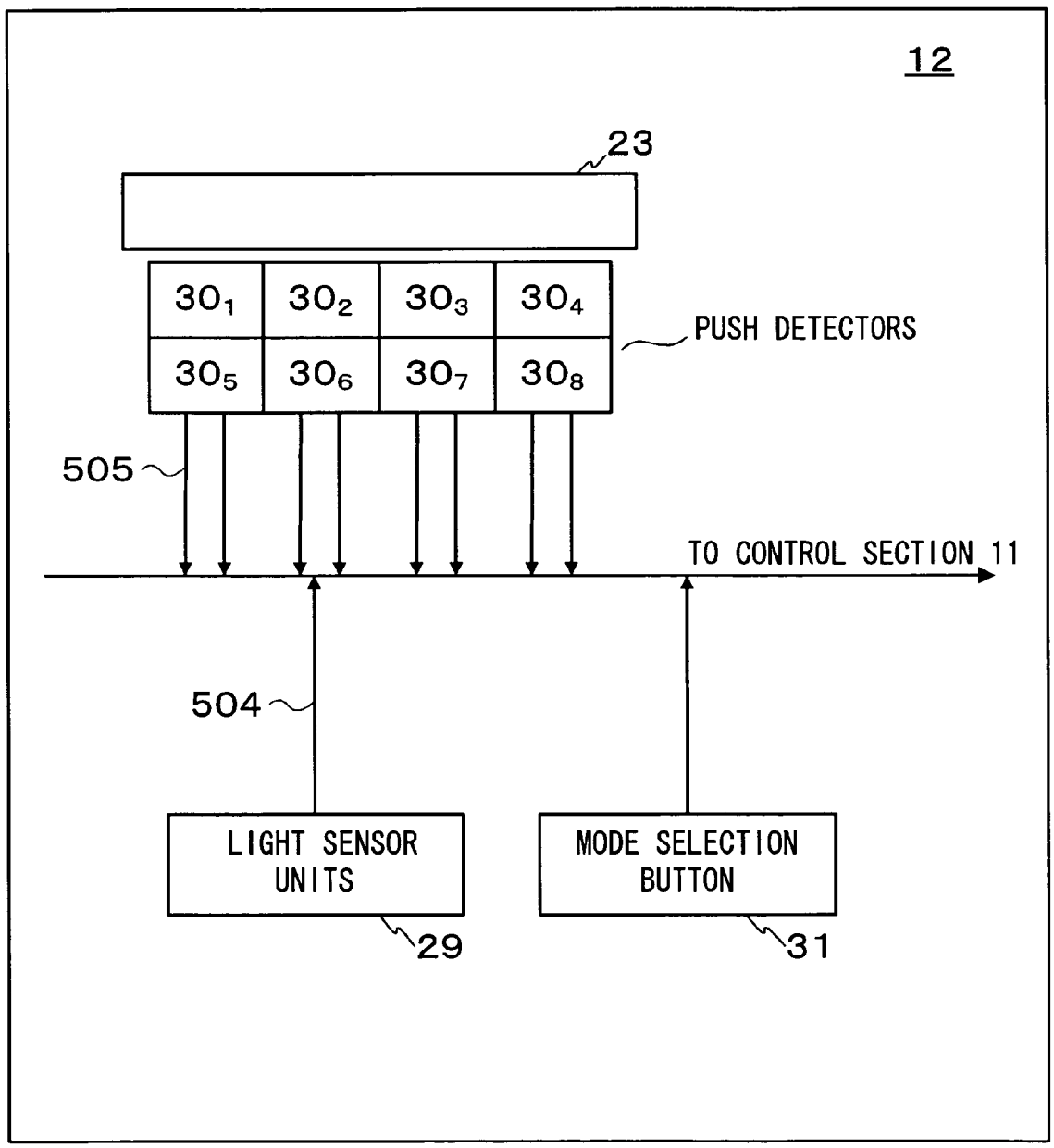
FIG. 5 is a functional block diagram showing an operating unit of the optical disc reproducing apparatus according to an embodiment of the present invention.

FIG. 5 shows a functional block diagram regarding the operating unit 12. Upon detecting a rotation of the operation disc unit 23, the light sensor units 29 output the first signals 504 to the controller 11. Upon detecting the depressing of the operation disc unit 23, the push detectors $30_1$ to $30_8$ transmit the second signals 505 to the controller 11. The mode selection button 31 accepts a selection input of one operation mode out of the multiple operation modes prepared for the operation disc unit 23, and outputs the selection input thus accepted to the controller 11.

The controller 11 stores in an internal memory (not illustrated), RAM and the like, functions as input buttons in each of the operation modes, respectively assigned to the push detectors $30_1$ to $30_8$. The controller 11 further stores in the internal memory and the like, predetermined instruction information in each of the operation modes, associated with the turning direction and the turning speed, which are detected by the light sensor units 29.

In the operation mode selected via the mode selection button 31, the controller 11 controls operations of the optical disc reproducing apparatus 100, on the basis of the inputs assigned to the turning direction and/or turning speed of the operation disc unit 23 which are determined according to the first signals from the light sensor units 29, and assigned to the second signals from the push detectors $30_1$ to $30_8$.

That is, in an operation mode, the controller 11 reads out from the internal memory and the like, an instruction assigned to the push detector which has been depressed, and performs control in accordance with the instruction. In addition, the controller 11 reads out an instruction information associated with the turning direction and/or the turning speed being determined, referring to the internal memory and the like, and performs control in accordance with the instruction information thus read out.

Figure 6:
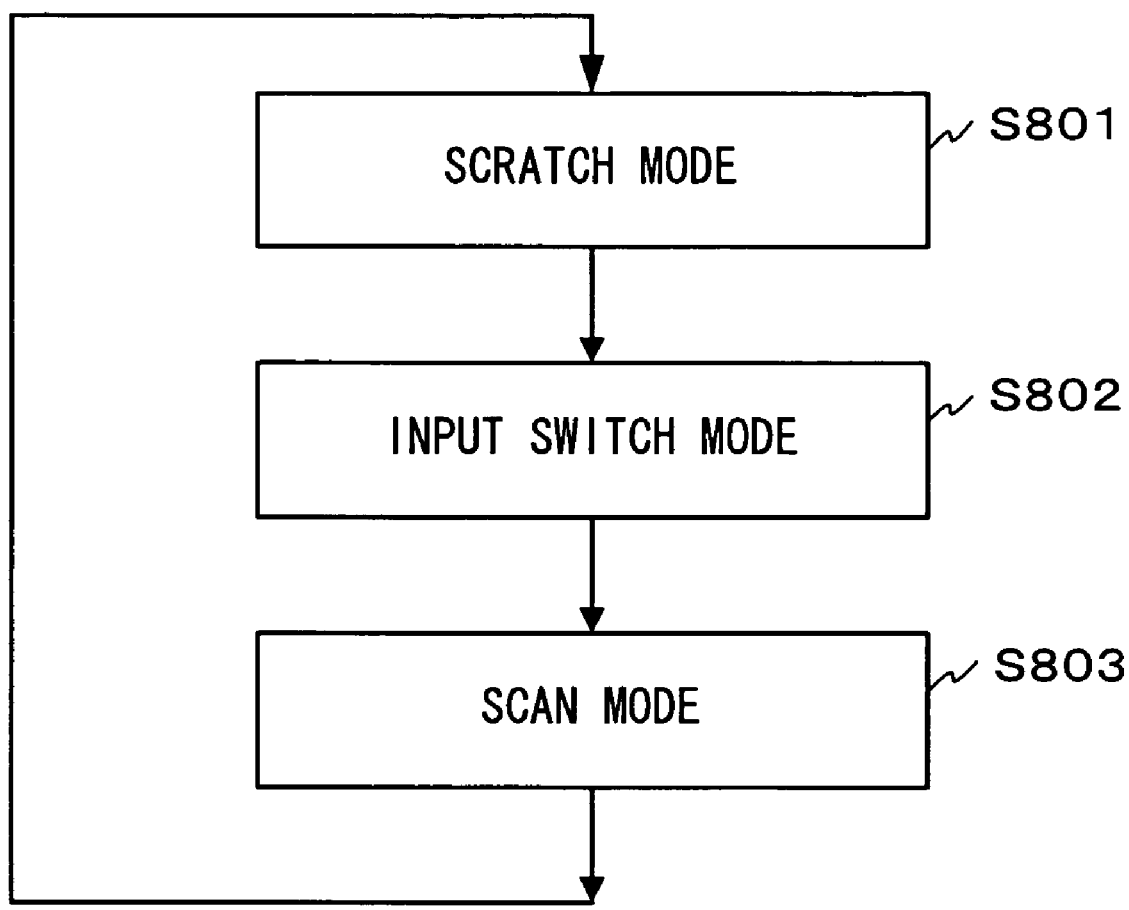
FIG. 6 is a flowchart to explain a mode switching of the optical disc reproducing apparatus according to an embodiment of the present invention.

Hereinafter, operations in the optical disc reproducing apparatus 100 according to the present embodiment will be explained. The optical disc reproducing apparatus 100 according to the present embodiment is operable in any one of the modes, scratch mode, input switch mode, and scan mode. For example, as shown in FIG. 6, the selected mode can be switched every time when the mode selection button 31 is depressed: scratch mode (S801)→input switch mode (S802)→scan mode (S803)→scratch mode (S801). Operations in the optical disc reproducing apparatus 100 with respect to each of the modes will be explained in the following.

(Scratch Mode)

When the mode selection button 31 on the operation disc unit 23 is depressed to select the scratch mode, the controller allows the LED 32 to light up and controls the push detectors 30 so that they operate in the scratch mode.

When the controller 11 accepts neither the first signal nor the second signal, in other words, when the operation disc unit 23 is not rotationally manipulated, the controller 11 performs a normal reproduction. In the normal reproduction, the controller 11 executes control to read out digital audio data from the RAM 8 to the memory controller 7 at a normal reading speed.

When a user performs a scratch reproduction, the user turns the operation disc unit 23 rapidly by hand clockwise or counterclockwise, while depressing the outer circumference of the operation disc unit 23, in the course of the normal reproduction. In general, when the scratch reproduction is performed by use of an analogue record player, a user turns the analogue phonorecord quickly against the rotation of the turntable. Therefore, the user performs the rotative manipulation while pressing the analogue phonorecord. Furthermore, when the user turns the analogue phonorecord, in order to easily rotate the analogue phonorecord, it is convenient for the user to place his or her hand on the outer circumference side of the analogue phonorecord rather than the inner circumference side thereof. Accordingly, when the user operates the operation disc unit 23 with the similar operation feeling as using the analogue record, the operation disc unit 23 is rotationally operated while the outer circumference area thereof is depressed.

When the user rotationally operates the operation disc unit 23 while depressing the outer circumference area thereof, the operation disc unit and other parts are bent downward with the depressing force. At this timing, when the outer circumference area of the table 21 depresses the switch portion 30a of any one of the push detectors, the push detector 30 generates a second signal and outputs the signal to the controller 11. In addition, when each light sensor unit 29 detects the slit portion 27a being rotating, each light sensor unit 29 generates first signals and outputs the signals to the controller 11. Accordingly, when the user rotationally operates the operation disc unit 23 while depressing the outer circumference thereof, the first signals and the second signal are outputted to the controller 11.

When both the first signals and the second signal are inputted in the controller 11, the controller 11 controls the memory controller 7 so that it reads out digital audio data from the RAM 8 at a speed and in a sequence (ascending order address or descending order address) according to the turning speed and the turning direction of the operation disc unit 23. For example, when the operation disc unit 23 is rotationally operated clockwise, while being held depressed, the controller 11 performs control so that the data is read out from the RAM 8 at a reading speed according to the turning speed and in ascending order address. On the other hand, when the operation disc unit 23 is rotationally operated counterclockwise, while being held depressed, the controller performs control so that the data is read out from the RAM 8 at a reading speed according to the turning speed and in descending order address (scratch function).

Here, the controller 11 performs control so as to return to the normal reproduction when the output of the second signal is stopped. Therefore, even when the rotation of the operation disc unit 23 does not stop immediately due to inertia force, it is possible to terminate the scratch reproduction at the time when the user moves his or her hand off from the operation disc unit 23.

When only the first signals are inputted in a state that neither the first signals nor the second signal have been inputted, the controller 11 controls the memory controller 7 so that the reading speed to read out the digital audio data from the RAM 8 is rendered higher or lower, according to a determined turning direction of the operation disc unit 23. In other words, when the operation disc unit 23 is turned with a downward force to a degree of not bending the operation disc unit 23, the memory controller 7 controls the reading speed of the digital audio data stored in the RAM 8 (pitch bend function).

At this stage, the controller 11 allows the LED 32 to light up when the second signal is outputted from the push detector 30, indicating currently being in the scratch function mode. On the other hand, the controller 11 turns off the light of the LED 32 when outputting of the second signal from any of the push detectors $30_1$ to $30_8$ is stopped, indicating currently being in the pitch bend function mode. By allowing the LED 32 to light up or turning off the light thereof, it is possible to show whether or not the switch is in a state of depressed.

(Input Switch Mode)

When the mode selection button 31 of the operation disc unit 23 is depressed, thereby the input switch mode is selected, the controller 11 controls the push detectors 30 so that they function in the input switch mode. When the input switch mode is selected by the mode selection button 31, the controller 11 makes the LED 34 to light up.

In the present embodiment, when the input switch mode is selected, the controller 11 assigns the functions of TIME button, PLAY MODE button, PRESET button, MEMO button and EFFECT (1 to 4) buttons, with which the similar kind of apparatus may be provided, respectively to the push detectors $30_1$ to $30_8$. The internal memory stores each of the functions. The internal memory may further store the function assignments to the push detectors 30, and the controller 11 may read out the assignments at the time of selection.

The controller 11 identifies which push detector ($30_1$ to $30_8$) has outputted the second signal thus received. For example, it is identifiable by connecting each of the push detectors $30_1$ to $30_8$ respectively with control lines different from one another.

The push detector $30_1$ to which TIME button has been assigned, outputs the second signal to the controller 11, when corresponding switch portion 30a is depressed. The controller 11 controls to display a reproducing time on the display section 13 based on track elapsed time, track remaining time and the like, when the second signal is inputted from the push detector $30_1$.

The push detector $30_2$ to which PLAY MODE button is assigned, outputs the second signal to the controller 11 when corresponding switch portion 30a is depressed. The controller 11 performs a reproduction when the second signal is inputted from the push detector $30_2$. Furthermore, it may be possible to define that the reproduction modes such as program reproduction, random reproduction and the like are changed depending on how the switch portion is depressed. For example, it may be possible to switch the reproduction modes as the following: when the switch portion is depressed once for a short time, the normal reproduction is performed; when the switch portion is depressed twice in succession, the random reproduction is performed; and when the switch portion is depressed for two seconds or longer, a specified program reproduction is performed.

The push detector $30_3$ to which the PRESET button is assigned, outputs the second signal to the controller 11 when corresponding switch portion 30a is depressed. When the second signal is inputted from the push detector $30_3$, the controller 11 performs control so that the mode shifts to the preset mode for setting the initial state. The controller 11 executes setting to initial state in the preset mode.

The push detector $30_4$ to which the MEMO button is assigned, outputs the second signal to the controller 11 when corresponding switch portion 30a is depressed. When the second signal is inputted from the push detector $30_4$, the controller 11 performs control so that the mode shifts to the memo mode for storing and reading the setup data such as A point and B point for the loop playback.

The push detectors $30_5$ to $30_8$ to which the EFFECT buttons 1 to 4 are assigned, respectively output the second signal to the controller 11 when corresponding switch portion 30a is depressed. When the second signal is inputted from any of the push detectors $30_5$ to $30_8$, the controller 11 performs control so that any of various effects 1 to 4 being predetermined, such as echo, plunger and the like are given to the audio data.

As thus described, since various types of input buttons are arranged efficiently below the operation disc unit 23, it is possible to reduce an area for the input buttons on the operation panel (the upper surface of the casing 28), compared to a similar conventional apparatus. In the present example, an area required for placing at least eight buttons can be reduced. Therefore, it is possible to secure a larger area for the operation disc unit 23, thereby offering an operation feeling similar to that of using an analogue phonorecord.

(Scan Mode)

When the mode selection button 31 of the operation disc unit 23 is depressed, thereby the scan mode is selected, the controller 11 performs control so that the push detectors 30 function in the scan mode. When the input switch mode is selected via the mode selection button 31, the controller 11 allows the LED 35 to light up.

In the present embodiment, when the scan mode is selected, the controller 11 assigns respectively to the push detectors $30_1$ to $30_8$, fast-forward and fast-reverse reproducing functions each at a predetermined speed. The internal memory stores each of the functions. The internal memory may further store the function assignments to the push detectors 30, and the controller 11 may read out the assignments at the time of selection.

In the present embodiment, fast-forward (i.e., increasing the reproducing speed in the normal reproducing direction) 2× scan function (in which reproducing speed is twice the normal reproducing speed) is assigned to the push detector $30_1$; fast-forward 4× scan function is assigned to the push detector $30_2$; fast-forward 8× scan function is assigned to the push detector $30_3$; and fast-forward 16× scan function is assigned to the push detector $30_4$. In addition, fast-reverse (i.e., increasing the reproducing speed in the reverse direction of the normal reproducing direction) 2× scan function is assigned to the push detector $30_5$; fast-reverse 4× scan function is assigned to the push detector $30_6$; fast-reverse 8× scan function is assigned to the push detector $30_7$; and fast-reverse 16× scan function is assigned to the push detector $30_8$.

When the second signal is inputted from any of the push detectors $30_1$ to $30_4$, the controller 11 executes fast-forward 2×, 4×, 8×, or 16× scan, and when inputting of the second signal is stopped, then the scan is stopped. When the second signal is inputted from any of the push detectors $30_5$ to $30_8$, the controller 11 executes fast-reverse 2×, 4×, 8×, or 16× scan, and when inputting of the second signal is stopped, then the scan is stopped. The controller 11 performs control so as to return to the normal reproduction, for example, after execution of the fast-forward/fast-reverse scan is stopped.

In the present embodiment, the user turns the operation disc unit 23, while pressing it down, whereby the scan speed can be varied. In other words, the controller 11 performs control so that the current scan speed is varied when the first signals and the second signal are inputted.

For example, in the present example, when the user turns the operation disc unit 23 clockwise up to the position of the push detector $30_2$ while depressing the push detector $30_1$, the second signal is inputted from the push detector $30_1$ into the controller 11, as well as the first signals indicating the rotative status (turning speed and turning direction) of the operation disc unit 23 is inputted from the light sensor units 29. When the first signals and the second signal are inputted, the controller 11 performs control so that the scan speed of fast-forward is increased gradually from 2× to 4×. For example, the controller 11 sets as a final speed, the scan speed assigned to one of the push detectors, from which the controller 11 has finally received the second signal. When the user further turns the operation disc unit 23 clockwise up to the position of the push detector $30_4$, the controller 11 performs control so that the scan speed of fast-forward is gradually increased from 2×, 4×, 8× to 16×. In the case of fast-reverse scan, the user turns the operation disc unit 23 counterclockwise while depressing it.

In the present embodiment, when the user turns the operation disc unit 23 with a downward force to the extent not depressing the switch portion 30a of any of the push detectors 30, manual searching is possible (searching in the unit of one frame). Upon receipt of the first signals only, the controller 11 conducts a search for a frame according to the turning direction of the operation disc unit 23. In this case, if the operation disc unit 23 is turned clockwise, the reproduction start position proceeds in the direction along which the frame number increases in the unit of one frame. On the other hand, if the operation disc unit 23 is turned counterclockwise, the reproduction start position proceeds in the direction along which the frame number decreases in the unit of one frame. When the turning of the operation disc unit 23 is stopped, the control unit 11 performs the normal reproduction from the reproduction start position thus designated. In addition, it may also be possible for the controller 11 to perform control so as to increase or decrease the number of frames to be skipped, according to the turning speed of the operation disc unit 23.

According to the embodiment as described above, it is possible to switch the modes, among the scratch mode, input switch mode and scan mode, by the mode selection button, and various operations in any of the modes can be instructed by a operation utilizing the operation disc unit 23. Therefore, operability can be enhanced. In addition, since it is possible to instruct different operations depending on whether the operation disc unit 23 is rotationally operated with a force to the extent not depressing the switch portion 30a of any of the push detectors 30, or it is rotationally operated with a force strong enough to depress the switch portion 30a, further enhancement in operability can be achieved.

In addition, since the operation disc unit also serves as multiple input switches and the like, the input buttons can be efficiently arranged. Therefore, the number of input switches other than the operation disc unit 23, which are to be provided on the operation panel, can be reduced, thereby rendering the area for the operation panel smaller.

In the present embodiment as described above, the scan direction and the scan speed are assigned to multiple, preferably at least three, push detectors 30. Therefore, the operator can easily select and designate the scan direction and the scan speed. Furthermore, while the operator holds the button downward (depressing any of the push detectors 30 below the operation disc unit 23), it is allowed to hold a selected direction and speed, and when the operator releases the button, it is allowed to stop fast-forward/fast-reverse at the scan position.

In some cases, another system may be employed, in which fast-forward/fast-reverse buttons are provided, one for each, and the scan speed is increased in proportion to the time period during when the button is depressed, in conducting the fast-forward/fast-reverse function. With such a system, speed controlling by the operator may be difficult. However, according to the present embodiment, the scan is performed at a predetermined constant speed, by selectively depressing multiple buttons, thereby facilitating the speed control. Furthermore, since these multiple buttons (push detectors 30) are efficiently provided below the operation disc unit 23, it is not necessary to reduce the area for the operation disc unit 23; on the contrary, a large area can be secured for the operation disc unit 23. Therefore, both the scan operability and the operability of the operation disc unit 23 can be improved.

In the embodiment of the present invention as described above, explanation has been made assuming that the elements for detecting depression are the push detectors 30 being push-style switches. However, it is possible to employ light sensors for the elements for detecting depression. For example, in the structure where the light sensors are utilized as the elements for detecting depression, the light sensors are mounted on the casing 28 at locations where they can detect the outer circumference of the table 21, when the outer circumference thereof is bent up to a predetermined position.

Furthermore, the operation disc unit 23 may be driven by a motor in accordance with the reproducing speed at the time of reproduction. In this case, a direction and speed driven by the motor are subtracted from the first signals indicating the turning direction and the turning speed, so as to calculate a turning direction and turning speed actually manipulated by the operator, thereby performing the similar processing as described above.

In the above embodiment, there has been explained an example of three operational modes. However, the present invention is not limited to this example, and the modes may be two, or four or more. For example, if an input switch mode is further added and another function of input switch is assigned thereto, the number of input switches can be further reduced.

In the above embodiment, the number of the push detectors 30 is eight. However, the present invention is not limited to this, and the number may be determined according to the size of the operation disc unit 23, and elastic strength of the table 21 and the operation disc unit 23. The push detectors 30 may not necessarily be placed at even intervals on the same radius, as far as they are arranged so that neighboring push detectors one another are not simultaneously depressed at the time when one of them is depressed. If neighboring push detectors 30 are simultaneously depressed, another instructing function of an input switch or a scan speed may be assigned, which are different from the above example.

In the above embodiment, the optical disc reproducing apparatus which reproduces audio data recorded to an optical disc has been explained as a way of example. However, the present invention is applicable to any type of apparatus which reproduces data recorded on an optical disc. For example, it is applicable to an apparatus which reproduces video data recorded on a DVD (Digital Versatile Disc). In this case, reproduced image data may be outputted to a display, a projector for home theater use, or the like.

Figure 7:
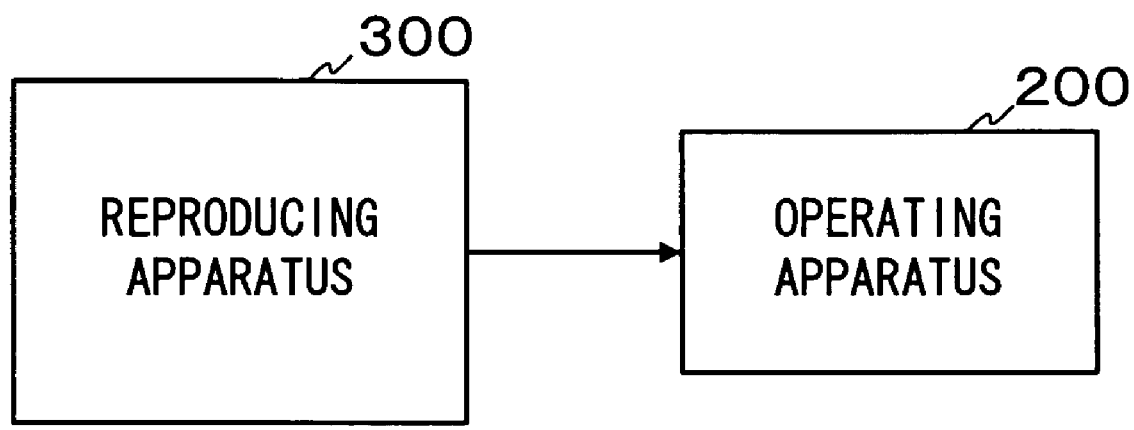
FIG. 7 is a block diagram showing an operating apparatus relating to another embodiment of the present invention.

The present invention is applicable to an operating apparatus which is provided with the same operating unit as described above, but is not provided with a reproducing section such as an optical pickup and the like. Such operating apparatus 200 as shown in FIG. 7 is connected to a reproducing apparatus 300 for another magnetic and/or optical recording medium such as magnetic/optical disc and the like. The operating apparatus 200, with respect to storing the data reproduced by the reproducing apparatus 300 in the self-contained memory and reproducing the data stored in the memory, is capable of providing each operating mode as described above to the user.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The disclosure of Japanese Patent Application Nos. 2003-391538 filed on Nov. 21, 2003, 2003-434156 filed on Dec. 26, 2003, 2004-082003 filed on Mar. 22, 2004, and 2004-221740 filed on Jul. 29, 2004, including specification, claims, drawings and abstract is incorporated herein by reference in its entirety.

What is claimed is:

1. An optical disc reproducing apparatus which reads out data from an optical disc, stores the data, and reproduces the stored data, the apparatus comprising:
 a casing;
 an operation disc unit for accepting an instruction as to a speed and a sequence for reading the stored data via a rotational operation therewith, the operation disc unit being provided on a surface of said casing;
 a selecting element for accepting a mode selection out of multiple operation modes; and
 a depression detecting element for accepting a different operation instruction depending on an operation mode selected via said selecting element by way of a depression of said operation disc unit, the depression detecting element being provided below said operation disc unit and on said surface of said casing.

2. The apparatus according to claim 1, further comprising,
 an instruction display element for indicating content of an instruction accepted by said depression detecting element, said instruction display element being provided on said surface of said casing.

3. The apparatus according to claim 1, further comprising a depression display element for indicating a depression of said depression detecting element.

4. The apparatus according to claim 1, comprising a plurality of the depression detecting elements, wherein,
 said depression detecting elements are provided in at least a number of operation types in an operation mode.

5. The apparatus according to claim 1, further comprising a first sensor for outputting a first signal according to a turning speed and a turning direction of said operation disc unit, wherein,
 said depression detecting element outputs a second signal according to a detection of a depression of said operation disc unit, and
 in one operation mode selected, the apparatus reads out the stored data at a speed and in a sequence according to said first signal when said first signal and said second signal are outputted, and the apparatus reads out the stored data at the speed according to the first signal when only said first signal is outputted.

6. The apparatus according to claim 1, further comprising,
 a mode display element for indicating an operation mode selected via said selecting element, said mode display element being provided on said casing.

7. The apparatus according to claim 1, comprising a plurality of said depression detecting elements, wherein,
 in one operation mode selected, said depression detecting elements respectively accept reproducing instructions for reproduction at different constant speeds.

8. The apparatus according to claim 7, wherein,
 when one of said depression detecting elements accepts the reproducing instruction and then said operation disc unit is rotationally operated, the reproducing speed is varied.

9. The apparatus according to claim 1, wherein,
 in one operation mode selected, said depression detecting element accepts an instruction to generate a predetermined effect sound.

10. The apparatus according to claim 2, comprising a plurality of said depression detecting elements, wherein,
 said depression detecting elements are provided substantially on the same radius and substantially at even intervals.

11. The apparatus according to claim 2, further comprising a selecting element for accepting a mode selection out of multiple operation modes, wherein,
 said depression detecting element is assigned with different operation instruction depending on operation mode selected via said selecting element.

12. The apparatus according to claim 11, comprising a plurality of said depression detecting elements, wherein,
 said depression detecting elements are provided in at least a number of operation types in an operation mode.

13. The apparatus according to claim 11, further comprising a first sensor unit for outputting a first signal according to a turning speed and a turning direction of said operation disc unit, wherein,
 said depression detecting element outputs a second signal according to a detection of a depression of said operation disc unit, and
 in one operation mode selected, the apparatus reads out the stored data at a speed and in a sequence according to said first signal when said first signal and said second signal are outputted, and the apparatus reads out the stored data at the speed according to the first signal when only said first signal is outputted.

14. The apparatus according to claim 11, further comprising,
 a mode display element for indicating an operation mode selected via said selecting element, said mode display element being provided on said casing.

15. The apparatus according to claim 11, comprising a plurality of said depression detecting elements wherein,
 in one operation mode selected, said depression detecting elements respectively accept reproducing instructions for reproduction for reproduction at different constant speeds.

16. The apparatus according to claim 15, wherein,
 when one of said depression detecting elements accepts the reproducing instruction and then said operation disc unit is rotationally operated, the reproducing speed is varied.

17. The apparatus according to claim 11, wherein,
 in one operation mode selected, said depression detecting element accepts an instruction to generate a predetermined effect sound.

18. A reproduction operating apparatus which reproduces data stored in a memory, comprising:
 a casing;
 an operation disc for accepting an instruction as to a speed and a sequence for reading the stored data via a rotational operation therewith, the operation disc unit being provided on a surface of said casing;
 a selecting element for accepting a mode selection out of multiple operation modes; and
 a depression detecting element for accepting a different operation instruction depending on an operation mode selected via said selecting element by way of a depression of said operation disc unit, the depression detecting element being provided below said operation disc unit and on said surface of said casing.

* * * * *